United States Patent
Kabannik

(10) Patent No.: US 12,378,874 B2
(45) Date of Patent: Aug. 5, 2025

(54) METHOD OF DETERMINING DEPTHS OF WELLBORE REFLECTORS

(71) Applicant: Schlumberger Technology Corporation, Sugar Land, TX (US)

(72) Inventor: Artem Valeryevich Kabannik, Novosibirsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 550 days.

(21) Appl. No.: 16/944,663

(22) Filed: Jul. 31, 2020

(65) Prior Publication Data

US 2021/0032978 A1    Feb. 4, 2021

(51) Int. Cl.
*G01B 5/18* (2006.01)
*E21B 43/26* (2006.01)
(Continued)

(52) U.S. Cl.
CPC .............. *E21B 47/04* (2013.01); *E21B 43/26* (2013.01); *E21B 47/06* (2013.01); *E21B 47/095* (2020.05);
(Continued)

(58) Field of Classification Search
CPC ........ E21B 47/04; E21B 47/095; E21B 43/26; E21B 47/06; G01B 5/18; G01B 13/14; G01V 1/48
See application file for complete search history.

(56) References Cited

U.S. PATENT DOCUMENTS

| | | |
|---|---|---|
| 4,802,144 A | 1/1989 | Holzhausen et al. |
| 5,031,163 A | 7/1991 | Holzhausen et al. |

(Continued)

FOREIGN PATENT DOCUMENTS

| | | | |
|---|---|---|---|
| RU | 2199005 C1 | 2/2003 | |
| WO | 2008118986 A1 | 10/2008 | |
| WO | WO-2018004369 A1 * | 1/2018 | ............. E21B 43/26 |

OTHER PUBLICATIONS

Broadhead, M. K., "Predictive deconvolution by frequency domain Wiener filtering", Journal of Seismic Exploration, 2009, 18, pp. 347-356.

(Continued)

*Primary Examiner* — Isam A Alsomiri
*Assistant Examiner* — Abdallah Abulaban
(74) *Attorney, Agent, or Firm* — Jeffrey D. Frantz

(57) ABSTRACT

This disclose relates to a robust method for automatic real-time monitoring or post-job evaluation of hydraulic fracturing operations based on predictive deconvolution of the wellhead pressure oscillations. Described are a method and system for determining depth of wellbore reflectors, implemented by performing a wellbore operation producing a pressure wave and its reflections from the wellbore reflectors; registering a pressure wave and its reflections; preprocessing the registered pressure wave and its reflections with a bandwidth filter; transforming the registered pressure wave and its reflections from the frequency domain into time-frequency representation with Short Time Fourier Transform (STFT); applying of a predictive deconvolution filter to STFT representation; identifying of a reflected signal on a plot in coordinates "reflection time—physical time" and determining the reflection time for the signal reflected from the wellbore reflector; determining the depth of wellbore reflector by multiplying the reflection time by pressure wave speed.

18 Claims, 10 Drawing Sheets

(51) Int. Cl.
*E21B 47/04* (2012.01)
*E21B 47/06* (2012.01)
*E21B 47/095* (2012.01)
*G01B 13/14* (2006.01)
*G01V 1/48* (2006.01)

(52) U.S. Cl.
CPC .............. *G01B 5/18* (2013.01); *G01B 13/14* (2013.01); *G01V 1/48* (2013.01)

(56) References Cited

U.S. PATENT DOCUMENTS

| | | | |
|---|---|---|---|
| 5,093,811 | A | 3/1992 | Mellor et al. |
| 5,170,378 | A | 12/1992 | Mellor et al. |
| 5,748,471 | A | 5/1998 | Grande |
| 6,724,687 | B1 | 4/2004 | Stephenson et al. |
| 6,978,211 | B2 | 12/2005 | Soliman et al. |
| 7,100,688 | B2 | 9/2006 | Stephenson et al. |
| 7,302,849 | B2 | 12/2007 | Segal et al. |
| 7,313,481 | B2 | 12/2007 | Moos et al. |
| 7,819,188 | B2 | 10/2010 | Auzerais et al. |
| 8,838,427 | B2 | 9/2014 | Segal et al. |
| 2004/0206494 | A1* | 10/2004 | Stephenson ............ E21B 49/00 166/308.1 |
| 2005/0086005 | A1* | 4/2005 | Taner .................... G01V 1/306 702/14 |
| 2005/0246131 | A1 | 11/2005 | Segal et al. |
| 2006/0017923 | A1* | 1/2006 | Ruchti ..................... G01J 3/28 356/326 |
| 2016/0245080 | A1* | 8/2016 | Sun .................... E21B 47/0228 |
| 2016/0356665 | A1* | 12/2016 | Felemban ........... G01M 3/2807 |
| 2020/0308958 | A1 | 10/2020 | Kabannik |
| 2021/0356617 | A1* | 11/2021 | Wilson ................ E21B 47/0025 |

OTHER PUBLICATIONS

International Search Report and Written Opinion of International Patent Application No. PCT/RU2019/000538 dated May 25, 2020, 7 pages.

Holzhausen, G. R. et al., "Impedance of Hydraulic Fractures: Its Measurement and Use for Estimating Fracture Closure Pressure and Dimensions", SPE-13892-MS, presented at the SPE/DOE Low Permeability Gas Reservoirs, Symposium, Denver, Colorado, 1985, 12 pages.

Parkhonyuk, S. et al., "Measurements While Fracturing: Nonintrusive Method of Hydraulic Fracturing Monitoring", SPE-189886-MS, presented at the 2018 SPE Hydraulic Fracturing Technolgoy Conference and Exhibition, The Woodlands, Texas, USA, 9 pages.

Peacock, K. L. et al., "Predictive Deconvolution Theory and Practice", Geophysics. 1969, 34(2), pp. 155-169.

Yilmaz, O., "Seismic Data Analysis: Processing, Inversion and Interpretation of Seismic Data", Editor S. M. Doherty, Society of Exploration Geophysicists, 2000, 24 pages.

Clearbout, J. F., "Fundamentals of Geophysical Data Processing", Blackwell Scientific Publications, 1976.—pp. 59-61.

Robinson Enders A. and Treitel Sven Geophysical Signal Analysis [Book].—Tulsa: Prentice-Hall, 2009.—pp. 22-29.

Substantive Exam issued in Saudi Arabia Patent Application No. 522431496 dated Sep. 27, 2023, 13 pages with English translation.

* cited by examiner

A wellbore operation producing a pressure wave and its reflections from the objects. (A time shift between original pressure wave and reflections)

Acquiring pressure data with a high-frequency pressure sensor (job record in pressure-time coordinates)

Preprocessing of data (bandpass filter 0-20Hz)

Applying of Short-Time Fourier Transformation (STFT) to pre-filtered data

Applying of Predictive Deconvolution (this useful signal and its regular reflections are elucidated)

Shifting of two sliding windows by $\Delta t$ and repeating the predictive deconvolution step
Repeating this step till, the end of chosen time interval (the decay of reflections)

The time coordinate for the chosen (traced) signal is the twofold travel time of the pressure wave to the reflecting object

The travel time multiplied by the pressure wave speed (constant or calculated by a special velocity model) is the true depth of the wave-reflecting object

FIG.4

METHOD OF DETERMINING DEPTHS OF WELLBORE REFLECTORS

CROSS-REFERENCE TO RELATED APPLICATIONS

This application claims the benefit of the filing date of International Patent Application Ser. No. PCT/RU2019/000538, filed Jul. 31, 2019, entitled "A METHOD OF DETERMINING DEPTHS OF WELLBORE REFLECTORS".

FIELD OF THE DISCLOSURE

The present disclosure relates to hydrocarbon production, particularly to the automatic monitoring of well operations, such as, for example, hydraulic fracturing, both in real time and post-job data analysis based on the predictive deconvolution analysis of well pressure data recorded by a pressure sensor at the wellhead.

Wellbore pressure oscillation analysis for hydraulic fracturing characterization has been known since 1985 as hydraulic impedance test (Holzhausen G. R. and Gooch R. P. Impedance of Hydraulic Fractures: Its Measurement and Use for Estimating Fracture Closure Pressure and Dimensions (SPE-13892-MS) [Book].: Society of Petroleum Engineers, 1985) and (Holzhausen Gary R. and Lawrence William St. Hydraulic fracture analysis method [Patent]: U.S. Pat. No. 4,802,144A, 1986). The oscillations are caused by pressure pulses propagating along the wellbore also called tube waves. The wellbore completion elements, such as hydraulic fractures, casing diameter changes, or wellbore restrictions, serve as effective wellbore reflectors for the tube waves. The wellbore reflector is defined as a site of changing the hydraulic impedance for the travelling pressure signal (discontinuities). The oscillation periods are two-way propagation times from the downhole reflectors to the surface. Thus, if the tube wave velocity is known, the reflection depths can be determined from the oscillation periods.

An approach to the wellbore pressure analysis and identification of wellbore objects utilizing the cepstrum algorithm for fluid entry point determination was suggested in WO2018004369. In the above method, the problem is solved in two independent steps:

Processing: the pressure oscillation periods caused by a pump shutdown induced in the end of treatments (a water hammer) are processed with cepstrum algorithm.

Postprocessing: the tube wave velocity model based on the pressure oscillation periods acquired at different treatment stages is determined. With a velocity model known, the fluid entry points (the depths of open fractures receiving the treatment fluid) are determined from the oscillation periods.

The intrinsic sensitivity of the cepstrum algorithm to presence of reflections (and periodicity) in the signal enables automatic processing of the pressure data: the oscillation events are detected by cepstrum intensity, the cepstrum peak positions correspond to oscillation period and its polarity indicates the reflector type. Being very sensitive to the reflections even with small amplitudes the cepstrum algorithm for data processing has a few of limitations:

It does not have dedicated sensitivity to the low wellbore resonance frequencies The water hammers are usually contaminated with the pump noise signal. The cepstrum algorithm amplifies the periodic pump noise signal that results in multiple strong cepstral peaks (so called "rahmonics") that overlap with the wellbore response and can be misinterpreted as multiple downhole reflectors (see FIG. 1).

The weak signal equally contributes to the solution as the strong one due to the cepstrum algorithm nonlinearity that might lead to unreasonable boosting of weak amplitude reflections or even noise These limitations result in high sensitivity of the solution provided by cepstrum to the time interval selection around the processed event. Practically, this instability means that small changes in time interval boundaries around the pressure oscillation event may lead to different results.

To overcome these limitations, the new method aimed to replace cepstrum algorithm at data processing stage is suggested in this disclosure. The new method is based on Wiener least squares prediction filter and is inspired by predictive deconvolution introduced by (Peacock K. L. and Treitel S. Predictive deconvolution theory and practice [Journal]//Geophysics.—1969.—Vol. 34.—pp. 155-169.) aimed to remove the multiples caused by seismic wave reverberations in a water layer from marine seismograms (Robinson Enders A. and Treitel Sven Geophysical Signal Analysis [Book].—Tulsa: Prentice-Hall, 2009.—pp. 22-29). According to their initial idea, the prediction filter is computed from the reverberation data and then the so-called prediction error filter is built. The prediction error filter is applied to the seismogram and suppresses the multiples keeping the useful seismic signal.

In this disclosure we perform only the first step—computation of the prediction filter which approximates the wellbore reflectivity response. Reflection point depth can be determined with the tube wave velocity. It can be as simple as constant velocity distribution along the wellbore and it can be determined using the technique disclosed in WO2018004369 included herein by reference.

It will be shown how to construct the prediction filter in both time and frequency domains. Frequency domain implementation of the filter is more computationally efficient than the time domain implementation.

BACKGROUND

Different techniques of wellbore pressure analysis are known from the prior art, for example, U.S. Pat. No. 7,100,688, Halliburton Energy Services Inc, "Fracture monitoring using pressure-frequency analysis".

In the proposed technique changes occurring downhole during a fracturing process can create or reflect pressure signals. Capturing and evaluating such pressure waves during fracturing enables personnel to monitor, in real time or later, what happens downhole. When a fracture extends, a burst of acoustic noise is embodied in a pressure wave or signal, as is noise coming from other sources. By transforming time-based pressure signals to a frequency base, one can monitor this acoustic noise. In a particular implementation, a waterfall plot of frequency spectra at successive time slices of the original signal is used to determine frequency ridges, such as a ridge of decreasing frequencies indicates fracture extension and a ridge of increasing frequencies indicates either closure or proppant backing up in the fracture.

Known also is document WO2018004369, Schlumberger Technology Corp, "Method and system for locating downhole objects which reflect a hydraulic signal".

The known technique relates to the field of hydrocarbon production, and more particularly to the monitoring of well operations by data analysis, based on cepstral analysis of downhole pressure data recorded at the wellhead. The method is designed to locate a downhole object which reflects a hydraulic signal, wherein: a well is provided which is filled with a fluid medium that permits the passage of a hydraulic signal; a hydraulic signal source is provided, which is in communication with the well via the fluid medium and is designed to generate a hydraulic signal, and a pressure transmitter is provided, which is designed to register the hydraulic signal and is in communication, via the fluid medium, with the well and with at least one hydraulic signal source. A hydraulic signal is registered using a pressure sensor, and a pressure cepstrogram (time-time coordinates) is generated, with highlighted intense signal on the pressure cepstrogram. Then the object which reflects the hydraulic signal is identified. A system is proposed for plotting a cepstrogram and locating a downhole object by wave reflections.

Known also is document U.S. Pat. No. 7,313,481, Geo-Mechanics International Inc, "Methods and devices for analyzing and controlling the propagation of waves in a borehole generated by water hammer".

The known technique proposes a method for simulating water-hammer waves in a borehole is used to estimate formation parameters such as porosity and permeability, and to design completion strings. The simulation method uses a model that has a plurality of layers, at least one of the layers includes radial layering. Determined formation properties from analysis of the water hammer are used in development operations. Here the water hammer does not provide information about completion elements or fracture position.

Known also is document U.S. Pat. No. 7,819,188, "Monitoring, controlling and enhancing processes while stimulating a fluid-filled borehole".

Tube waves are used as tools for detecting and monitoring of feature state to enhance stimulation operations and remediate failure conditions. For example, proper sealing of perforations may be confirmed based on lack of a reflection of a tube wave by the perforations. Alternatively, at least one of amplitude, frequency, attenuation, dispersion and travel time associated with a tube wave and reflection may be used to determine perforation state.

A typical seismic data processing stream that assumes minimum phase property of the seismic wavelet is predictive deconvolution. Science defines "deconvolution" as a "data processing technique applied to the data for the purpose of improving the recognizability and resolution of reflected events." The purpose of performing predictive deconvolution is to remove a predictable part of the data defined in terms of a prediction distance, thus attenuating periodic "multiples" and, as an option, compressing the wavelet. However, predictive deconvolution can be applied not only to seismic, but to other problems where the small-amplitude repeated signal must be extracted at the background of powerful "noise".

There is a need in robust and effective method for determination of position of a borehole object (a reflector) that does not require additional equipment, but relies on standard set of monitoring devices.

SUMMARY

This disclose relates to an robust method for automatic real-time monitoring or post-job evaluation of hydraulic fracturing operations based on predictive deconvolution of the wellhead pressure oscillations. According to the disclosed method the predictive deconvolution operator is computed aimed to estimate of the input signal at some future time by linear combination of its past samples. This prediction operator can be obtained by inversion of normal regularized equation system in time domain or spectral division in the frequency domain. The wellbore reflectivity intensity plot is computed, which is visual representation of the prediction operator as it varies with time. The wellbore reflectivity approximated with the prediction operator is more robust and is less sensitive to the background noise than known nonlinear methods (e.g., cepstrum algorithm for pressure data processing).

In accordance with the present disclosure described is a method and a system for determining depth of wellbore reflectors by analyzing the wellhead pressure signal, comprising: performing a wellbore operation producing a pressure wave and its reflections from the wellbore reflectors; registering a pressure wave and its reflections with a high-frequency pressure sensor at wellhead; preprocessing the registered pressure wave and its reflections with a bandwidth filter; transforming the registered pressure wave and its reflections from the frequency domain into time-frequency representation with Short Time Fourier Transform (STFT); applying of a predictive deconvolution filter to STFT representation which produces the normalized intensity of wellbore reflectivity; identifying of a reflected signal on a plot in coordinates "reflection time—physical time" and determining the reflection time for the signal reflected from the wellbore reflector; determining the depth of wellbore reflector by multiplying the reflection time by pressure wave speed.

In accordance with the present disclosure the pressure oscillations are automatically detected and traced on the reflectivity intensity plot followed by determination of their periods and polarities that, in turn, are used to determine the depths and nature of corresponding wellbore reflectors.

The following advantages and new features of this disclosure are as follows:

Effectiveness: automatic detection of pressure oscillation event and processing decrease the processing time and eliminate inaccuracies related to human factor in manual processing of pressure signal.

Robustness: predictive deconvolution is linear algorithm and therefore unlike cepstrum algorithm (see prior art) it is insensitive to small amplitude noise and harmonic pump noise. At the same time, it is sensitive to the wellbore pressure oscillation frequency.

Simplicity: the method can be implemented with a high-frequency pressure sensor available in the on-surface treatment line, available data acquisition card and a computer for data processing and visualization.

BRIEF DESCRIPTION OF DRAWINGS

Hereinafter, the embodiments of this disclosure are described in more detail by means of drawings, wherein:

FIG. 4 shows a flowchart of the method for monitoring wave-reflecting objects in a wellbore using innovative algorithm for processing of reflected pressure signal.

DETAILED DESCRIPTION OF EMBODIMENTS

Figure 1:
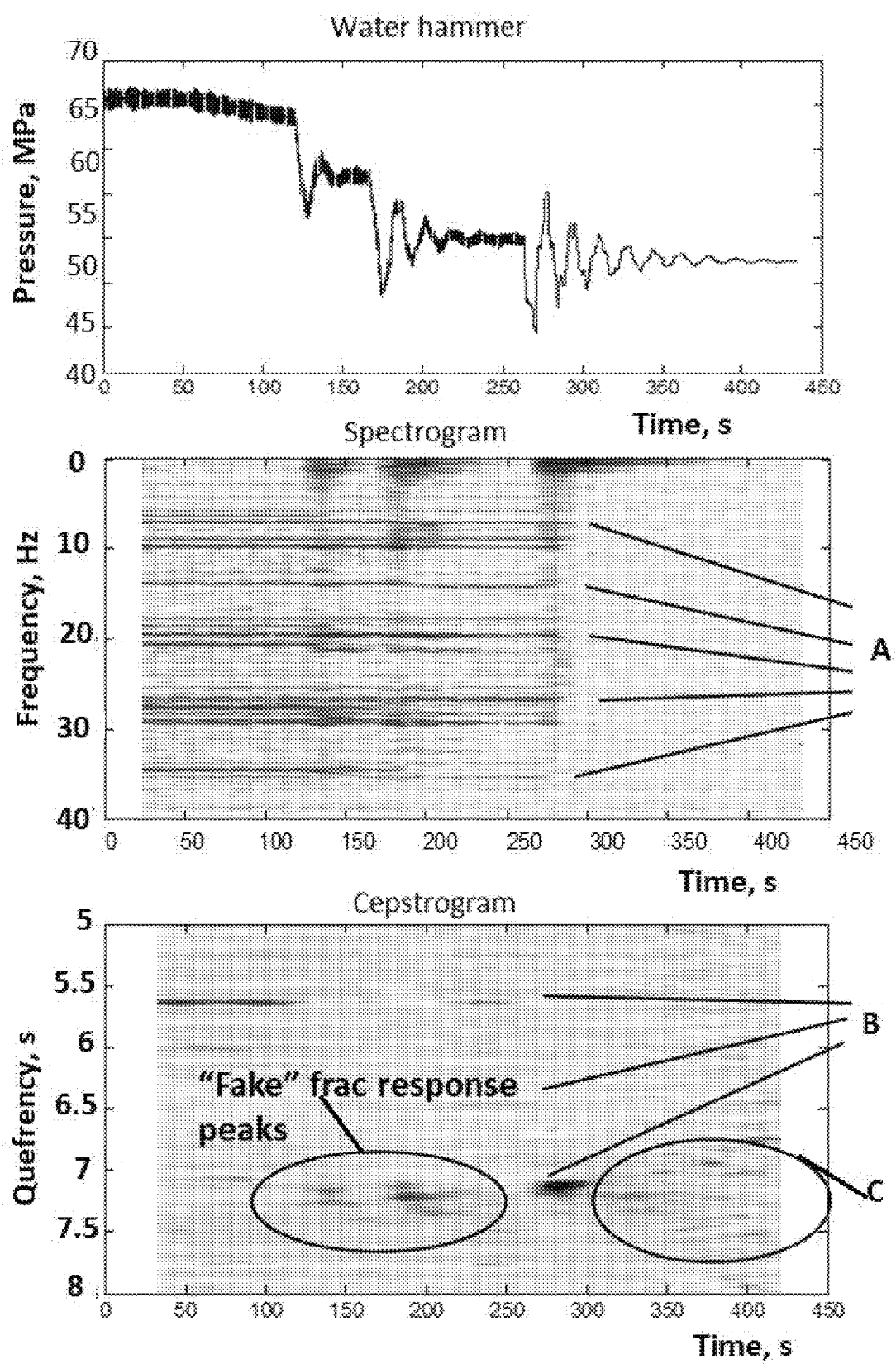
FIG. 1 shows prior art cepstrum algorithm limitations in identification of wellbore reflectors: "fake" frac response peaks due to pump noise and unreasonable boost of low amplitude signal because of non-linearity of solution. Where A stipulates—Pump noise harmonics; B stipulates—Pump noise rahmonics; C stipulates—Unreasonable boost of low amplitude signal.
Figure 2:
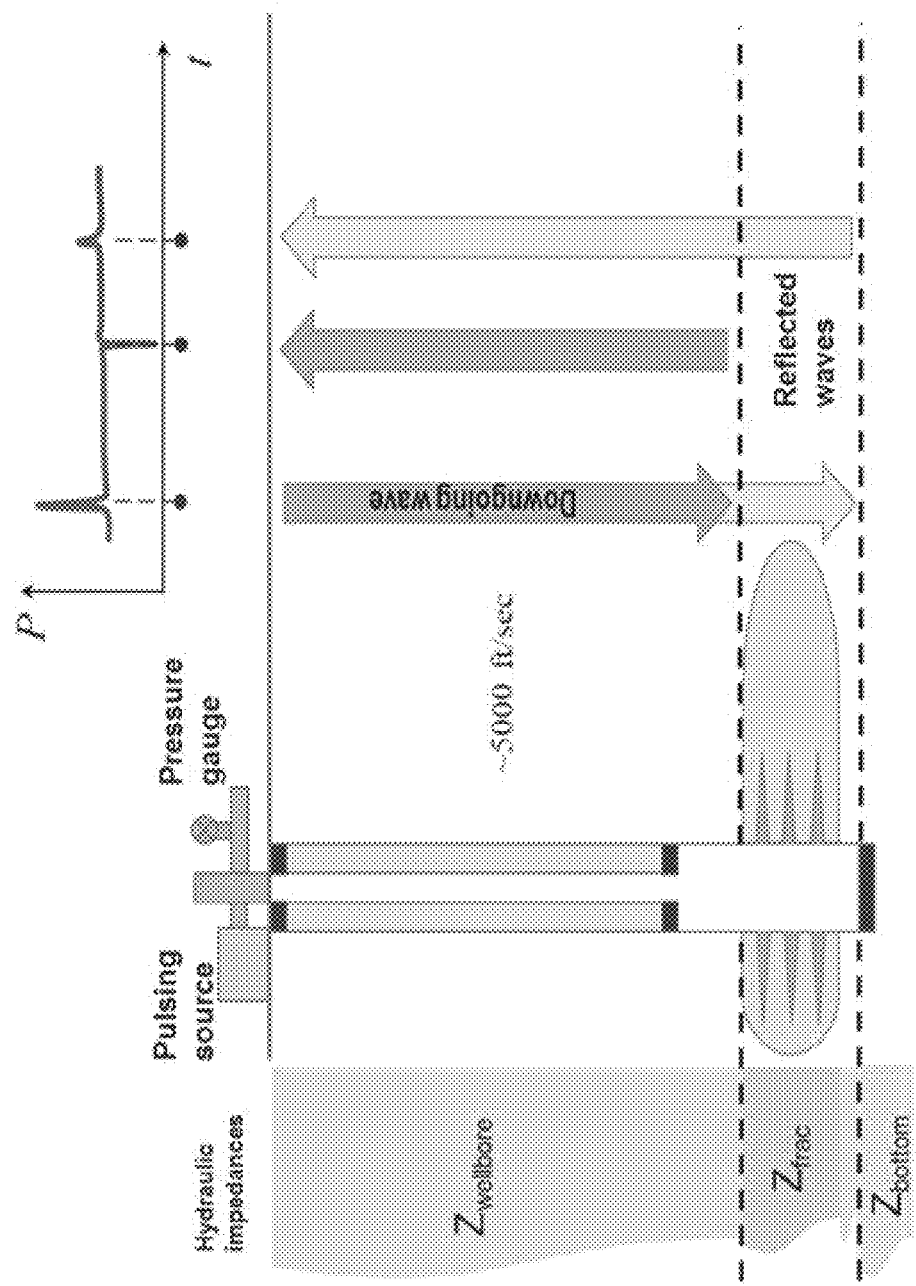
FIG. 2 shows tube waves (pressure wave) propagation in a wellbore.

As a descriptive example of the disclosure a cased treatment well is shown in FIG. 2A. Periodic pressure pulses can be induced by a hydraulic pulse source such as pressure strokes of reciprocal pump operation, a perforation shot, etc.

Let the wellbore contain changes in casing diameter and/or several fractures. All these objects have different hydraulic impedances and serve as downhole reflectors at unknown depth, so the pressure wavelet with velocity (about 1500 m/s) is not known in general.

Each time the pressure signal (here—a tube wave, an oscillating waveform) meets the wellbore reflector, it reflects partly and propagates along in parts. The wellhead pressure signal can be acquired as a discrete signal x(n) with the surface pressure sensor, where n is a sample number. Our goal is to determine depths and types of downhole reflectors by analyzing the surface pressure signal x(n).

The problem is solved by two independent steps. At the first step the pressure data is processed to determine the two-way travel times of the tube waves. For the second step the tube wave velocity model applied to the two-way travel time data to determine depths of the downhole reflectors. The velocity in the wellbore can be assumed constant (Holzhausen G. R. and Gooch R. P. Impedance of Hydraulic Fractures: Its Measurement and Use for Estimating Fracture Closure Pressure and Dimensions (SPE-13892-MS): Society of Petroleum Engineers, 1985) or more sophisticated model can be applied that produces depths of the downhole reflectors (i.e., fractures) as well as their uncertainties and probabilities.

Predictive Deconvolution

By analogy to the convolutional model of recorded seismogram (Yilmaz O. and Doherty S. M. Seismic Data Analysis: Processing, Inversion and Interpretation of Seismic Data [Book], Society of Exploration Geophysicists, 2000), where a seismic trace is represented as a convolution of source wavelet with earth's reflectivity series, we introduce the convolutional model of the discrete pressure oscillation record x(n), that is represented as convolution of the source wavelet s(n) and the reflectivity of the wellbore w(n).

$$x(n)=s(n)*w(n) \quad (1)$$

The source wavelet s(n) in equation (1) is any type of intense pressure signal caused by water hammer, perforation shots or frac pump piston strokes. The wellbore reflectivity w(n) is the wellbore response to the unit pulse. It is the wellbore reflectivity w(n) that we are interested in as the output of the processing stage.

Figure 3:
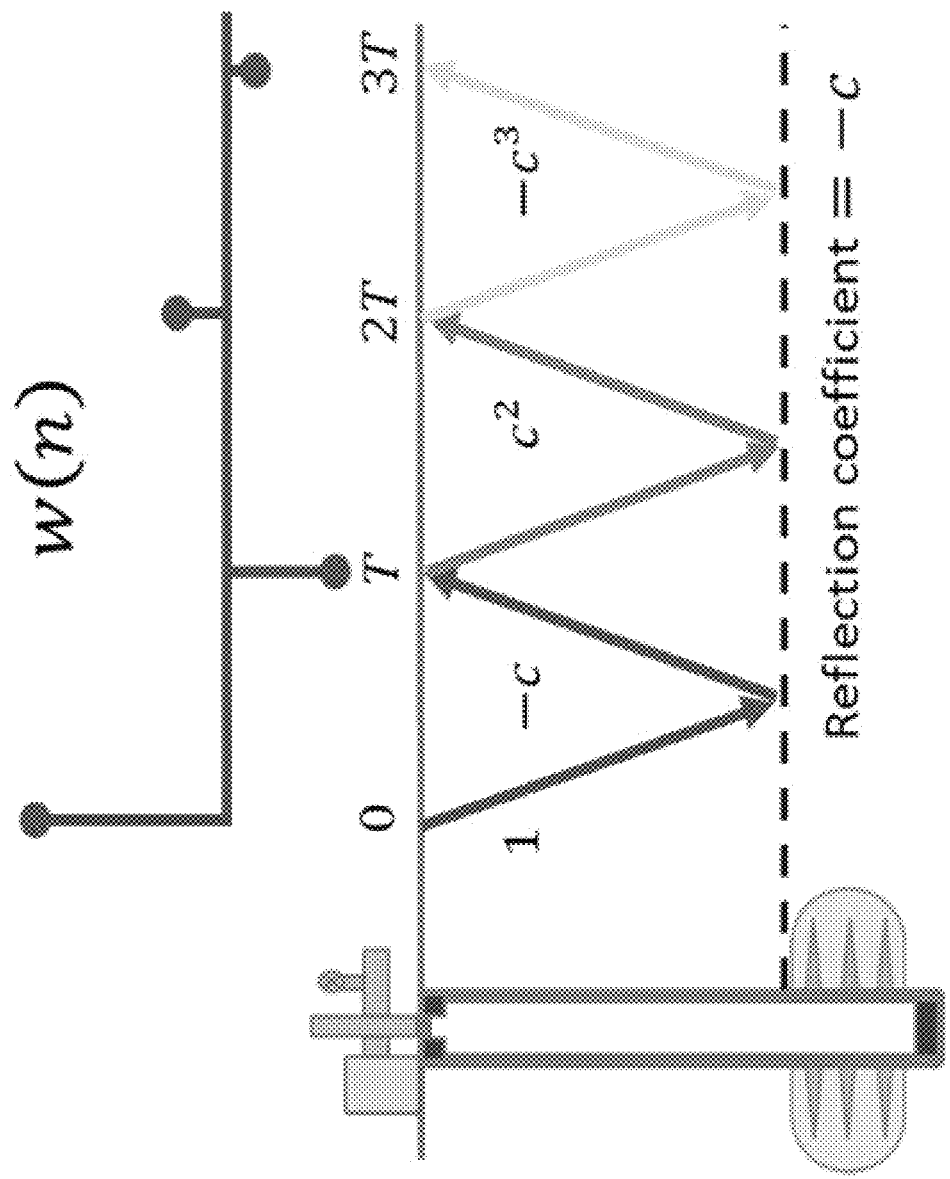
FIG. 3 shows an example of the wellbore reflectivity w(n) for a simple case, where the fracture reflection coefficient is equal to -c and two-way travel time is equal to T.
Figure 5:
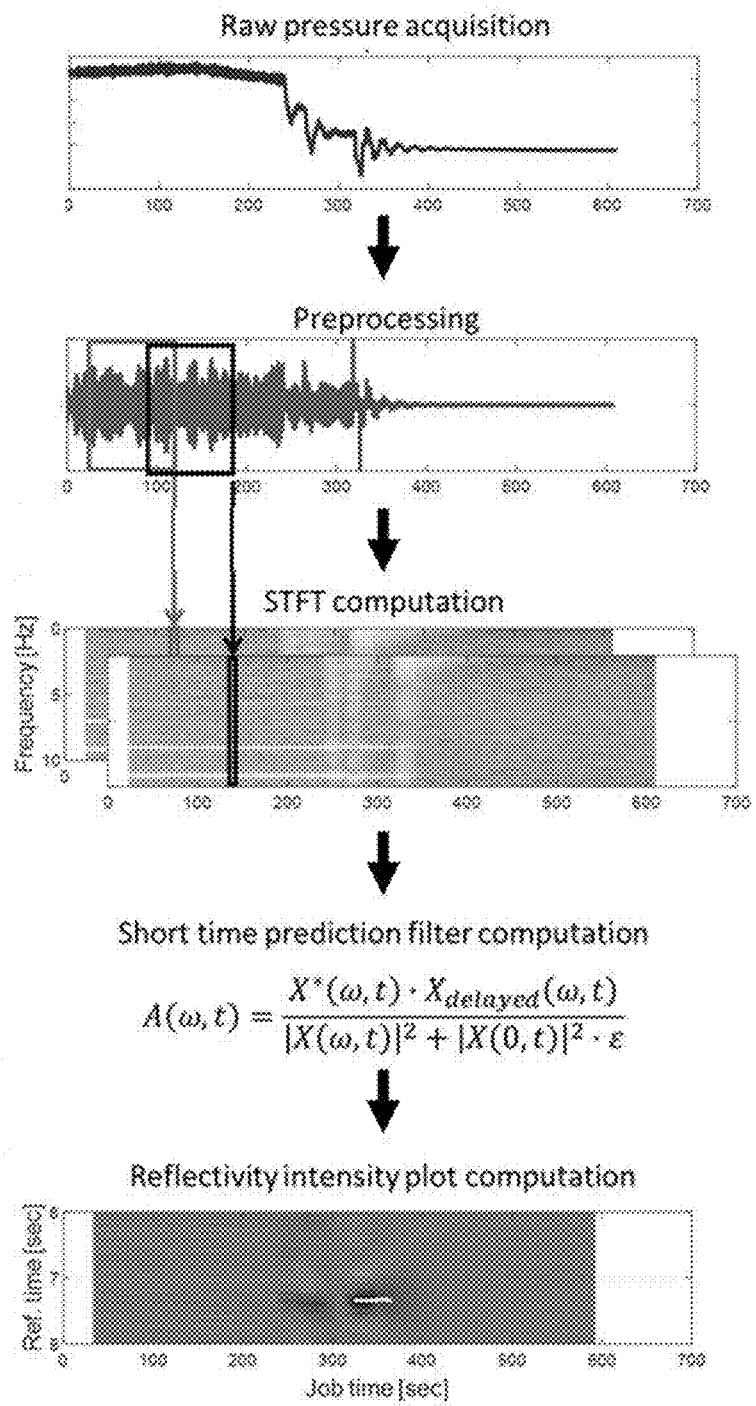
FIG. 5 shows predictive deconvolution workflow in intermediate and final graphs.

Normally, the wellbore reflectivity w(n) is decaying minimum-phase train of pulses delayed by the arrival times while their amplitudes depend on corresponding reflection coefficients and wave attenuation in the wellbore. The reflection coefficients are determined by impedance changes at the reflection boundaries: for hydraulic fractures they are negative and for wellbore restrictions they are positive. Therefore, the wellbore reflectivity is highly predictable due to its periodic structure. An example of the wellbore reflectivity w(n) for a simple case, where the fracture reflection coefficient is equal to "–c" and two-way travel time is equal to T is shown in FIG. 3.

Unlike the wellbore reflectivity w(n) the source wavelet s(n) is generally unknown and can be considered as random uncorrelated signal.

The equation (1) is solved with the predictive deconvolution algorithm (see Robinson Enders A. and Treitel Sven Geophysical Signal Analysis [Book].—Tulsa: Prentice-Hall, 2009.—pp. 22-29), that extracts the predictable part and suppresses the stochastic one.

The predictable part of the equation (1) is obtained by construction of prediction operator with prediction distance $\alpha$ aimed to estimate of the input x(n) at some future time n+$\alpha$ by linear combination of N past samples (N is called an operator length):

$$\hat{x}(n+\alpha) = \sum_{k=0}^{N} \alpha_k x(n-k) \quad (2)$$

where $\hat{x}(n+\alpha)$ is an estimate of x(n+$\alpha$). The difference between the true and predicted values represents the non-predictable part of the signal: $s(n+\alpha)=x(n+\alpha)-\hat{x}(n+\alpha)$, which is random by our assumption.

The equation (2) is transformed to the regularized normal equations that is solved in the least squares sense for the unknown coefficients $a_0, a_1, \ldots, a_N$.

Computation of the prediction operator coefficients by inversion of the regularized normal equations involves significant computational costs. For example, using of Levinson recursive procedure (standard in predictive deconvolution) requires operation count to an order $N^2$ Determination of the prediction operator in frequency domain is much less computationally expensive alternative to time domain implementation described above.

In "Predictive deconvolution by frequency domain wiener filtering", Michael K. Broadhead, Journal of Seismic Exploration 18, 347-356 (2009), provided is a frequency domain formulation of predictive deconvolution:

Estimate minimum phase version x_m (n) of the input signal x(n) from the trace autocorrelation function by Kolmogorov minimum phase spectral factorization (see "Fundamentals of Geophysical Data Processing", Jon F. Claerbout, Blackwell Scientic Publications, Inc, (1976)).

Obtain the point forward shifted version of x_m (n), that is labelled as $x_{m_\alpha}(n)$ Compute the prediction filter in frequency domain as an optimum Wiener filter (a form of predictive deconvolution for our case) in the frequency domain:

$$A(\omega) = \frac{X'_m(\omega) X_{m_\alpha}(\omega)}{|X_m(\omega)|^2 + |X(0)|^2 \cdot \varepsilon} \quad (3)$$

where capitals indicate the Fourier transform.

Obtain prediction operator coefficients $a_0, a_1, \ldots, a_N$ as an inverse Fourier transform of $A(\omega)$.

This workflow reduces the number of operations to an order of $M \cdot \log_2 M$ operation count.

Data Processing Workflow

FIG. 4 presents a flowchart of the method for monitoring wave-reflecting objects in a wellbore using innovative algorithm for processing of reflected pressure signal; the detailed description of the steps in the flowchart is given in the sections below.

Raw Data Acquisition

Wellhead pressure is acquired with a data acquisition system (high-frequency pressure sensor and analog digital converter (ADC).

Preprocessing

The raw wellhead pressure signal consists of the following components:

The periodic spectrum of the wellbore reflectivity modulated by the spectrum of the pressure oscillation source wavelet.

Zero-Frequency (DC) Component Related to the Slow Pressure Variations

Broadband electronic noise and narrow harmonic peaks caused by hydraulic pump strokes.

It is the periodic structure of the wellbore response modulated by the source wavelet that contains the useful signal for processing. The bandwidth of the useful signal of the typical water hammer is limited between 0.1 and 15-20 Hz. Additionally, the least-square filtering concept implemented in the predictive deconvolution filter imposes signal stationarity assumption, that requires removing the zero-frequency component.

Therefore, at the preprocessing stage there is a need to preserve the periodic structure of the useful signal within its and get rid of both zero-frequency component and the noise located outside of the signal bandwidth that can be accomplished by applying the bandpass filter to the raw signal. The optimal approach is using a linear combination of the zero frequency notch filter and Butterworth lowpass filter (or equivalent filters—e.g., the Gaussian derivative filter). The general rule of thumb is that increasing the preprocessing filter bandwidth sharpens the reflectivity peaks that results in better resolution but degrades the peak tracing stability (see below on the tracing algorithm). On the other hand, decreasing the filter bandwidth improves the peak tracing stability but degrades the resolution.

STFT Computation

The signal stationarity assumption mentioned above is valid only in short time intervals (~30 seconds). In fact, the wellbore reflectivity is not stationary in the sense that it continuously changes throughout hydraulic fracturing treatment job. Indeed, changing of fluid properties or downhole completion configuration during the treatment affects both two-way travel times and amplitude of the signal. Therefore, the Fourier domain representations of the original and delayed signals are obtained with the widely used Short Time Fourier Transform (STFT).

Short Time Prediction Filter Computation

The short time prediction filter is computed as follows:

$$A(\omega, t) = \frac{X^*(\omega, t) \cdot X_{delayed}(\omega, t)}{|X(\omega, t)|^2 + |X(0, t)|^2 \cdot \varepsilon}$$

Where $X(\omega, t)$ and $X_{delayed}(\omega, t)$ are STFT computed for the main and delayed pressure signal.

Reflection Intensity Plot Computation and Peak Tracing

By taking an inverse Fourier transform of each time slice of the short time prediction filter the reflection intensity plot is computed.

Figure 6:
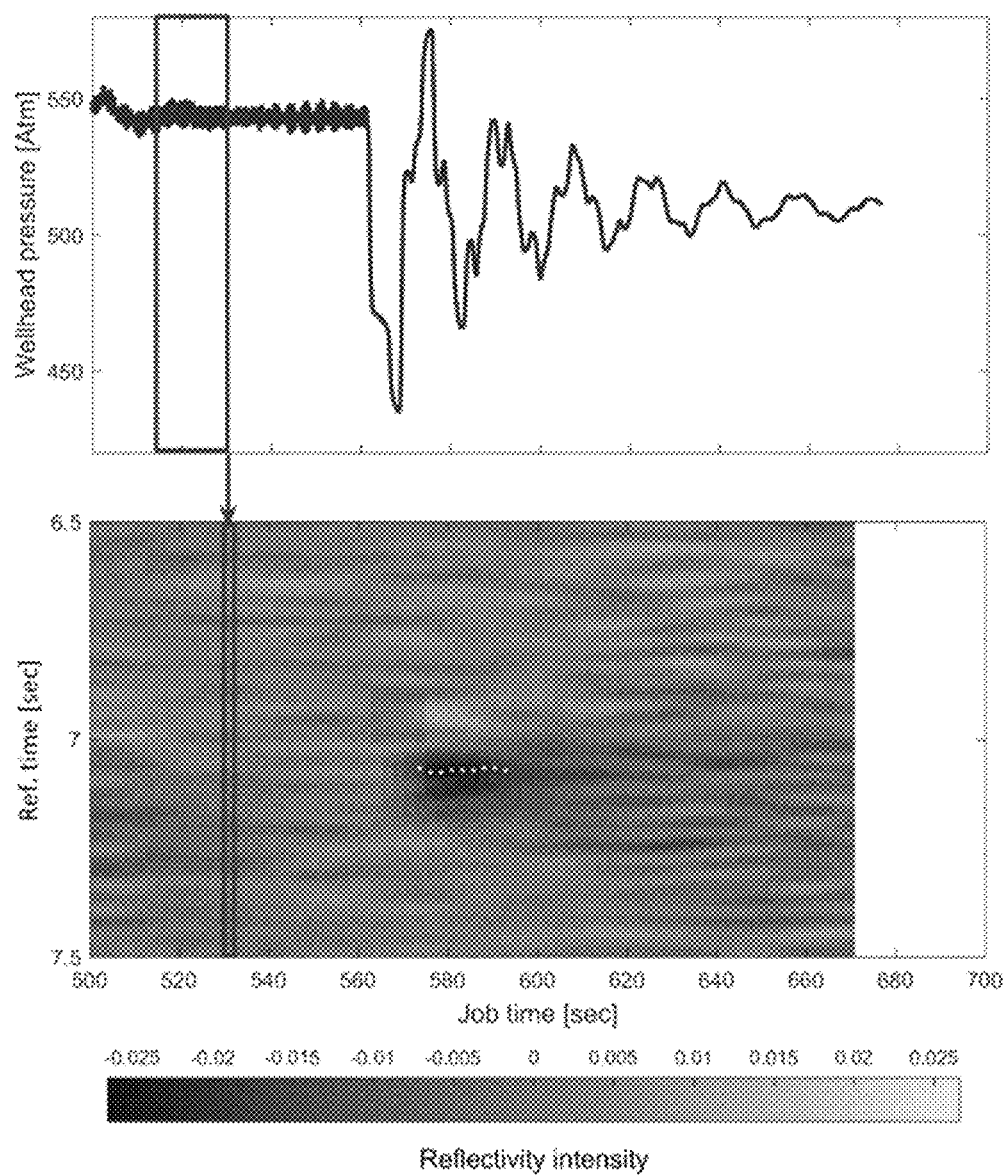
FIG. 6 shows reflectivity intensity computation by predictive deconvolution in a sliding window and strong intensity peaks. Quefrency as a vertical axis is a plotting for reflection time (calculated in seconds).

The intensity plot computation is shown in FIG. 6: each window then corresponds to a vertical line in the intensity image; a measurement of reflectivity magnitude versus two way-travel time (reflection time) for a given time moment plotted in the horizontal axis.

To increase signal to noise ratio, the reflectivity intensity plot can be averaged over the time axis. This procedure is referred to as stacking.

The wellbore pressure oscillations caused by tube wave reflections from the objects with lower hydraulic impedance are manifested by strong negative peaks on the reflectivity intensity plot (marked as 1 (dark tint) in the map) at appropriate two-way travel times. Similarly, the wellbore pressure oscillations caused by tube wave reflections from the object with a higher hydraulic impedance results in strong positive peaks on the reflectivity intensity plot (stated as 2 (grey tint) in the map).

The contour of two-way travel times for a particular reflector is determined by tracing the strong positive or negative peaks.

The contour of two-way travel times for a particular reflector is determined by tracing the strong positive or negative peaks. The tracing algorithm identifies the strong peaks that meet the following criteria:

1. The peak amplitudes exceed a predefined intensity threshold;
2. The traced peak lengths exceed a predefined length threshold;
3. The scatter range of the traced peaks is below a predefined outlier threshold.

The temporal positions of the traced contours indicate time intervals when the pressure oscillations are detected, while their vertical axis positions are two-way arrival times. (The Reflection time [sec] is plotted in FIG. 6 as a vertical axis). In FIG. 6 the negative peaks on the reflectivity intensity plot correspond to the tube wave reflections from the fracture traced by the two-way travel time contours marked as 3 (white dots).

Depth Determination For Wellbore Reflectors

Depths of the wellbore objects reflecting the tube waves are the answers that the end user is interested in. Reflection point depth can be determined with the tube wave velocity. It can be as simple as constant velocity distribution along the wellbore or can be determined using the technique disclosed in WO2018004369 included herein by reference.

Data Processing Examples

The multistage well treatment data with 14 perforation intervals was used to illustrate performance of the predictive deconvolution algorithm for determination of multiple fluid entry points (open fractures in one wellbore). The simplified images of raw pressure signal are depicted in the top (FIG. 7A).

The analysis with predictive deconvolution filter was performed for multi-stage (multi-reflectors) situation. All the intervals were mechanically isolated with bridge plugs conveyed by a wireline. The first interval was completed conventionally by pumping one stage per interval. For the remaining intervals, a treatment sequence consisting of two stages separated by a "diversion pill" (slurry of solid particle and fibers pumped for fracture isolation (or fracture plugging)) was pumped to achieve the more uniform stimulation of all remained intervals. The role of the diverter pill is to temporarily isolate clusters receiving the fluid during the first stage and divert the stimulation fluid to the previously unstimulated clusters within the open interval.

Figures 7A, 7B:
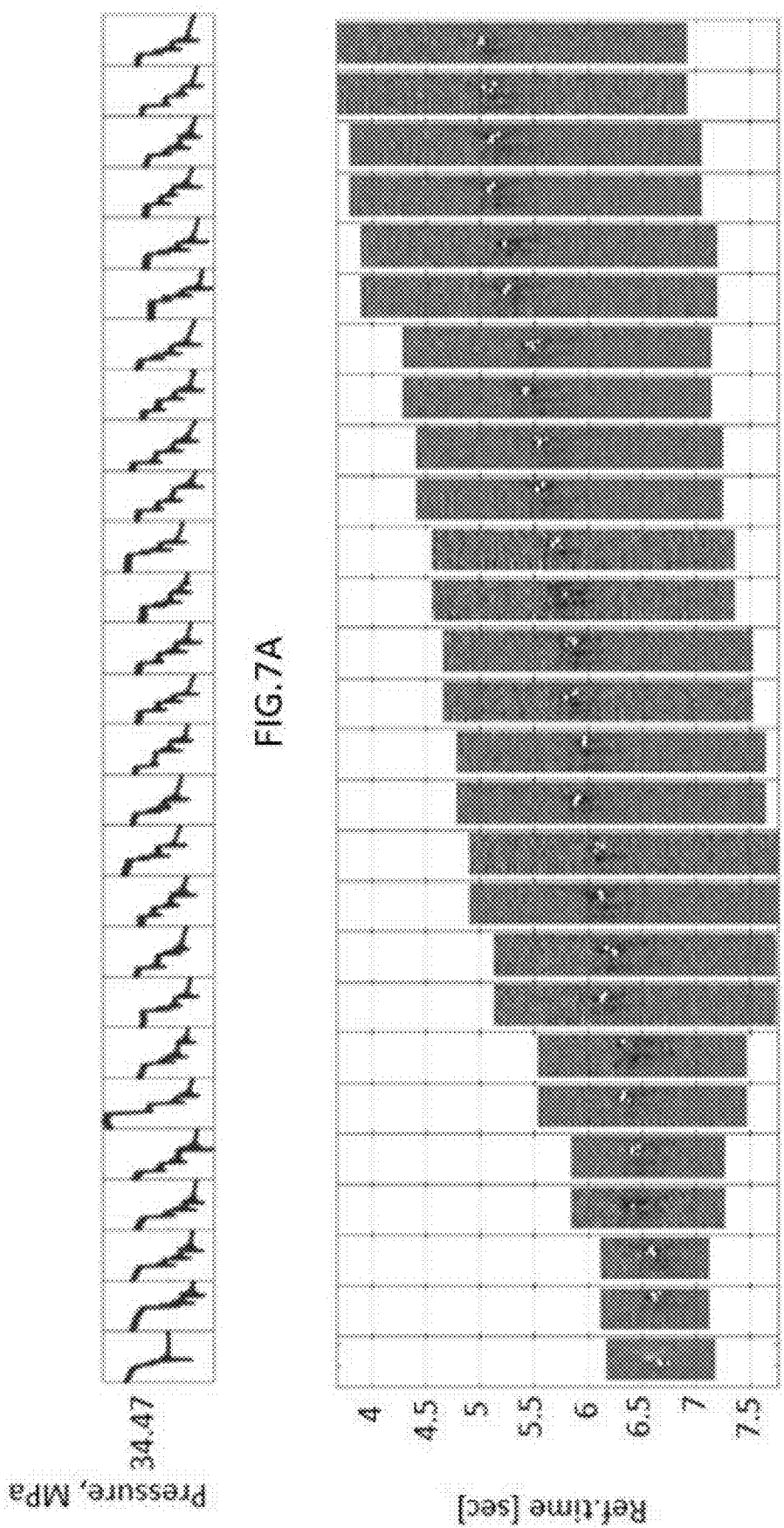
FIGS. 7A and 7B. Reflectivity intensity plots computed for the water hammer events generated at the end of the treatment stages. Initial pressure signals (input data) are depicted at FIG. 7A. The filtered and processed signals are at FIG. 7B.

Reflectivity intensity plots computed by predictive deconvolution algorithm for the water hammer events (generated at the end of the treatment stages due to a stop of fracturing pump) are shown in FIG. 7B. The most intensive reflectivity signal (traced are marked as 3) gradually evolves from 6.7 seconds for the deep stages to 5.5 seconds for the shallow stages of frac ports.

Figure 8:
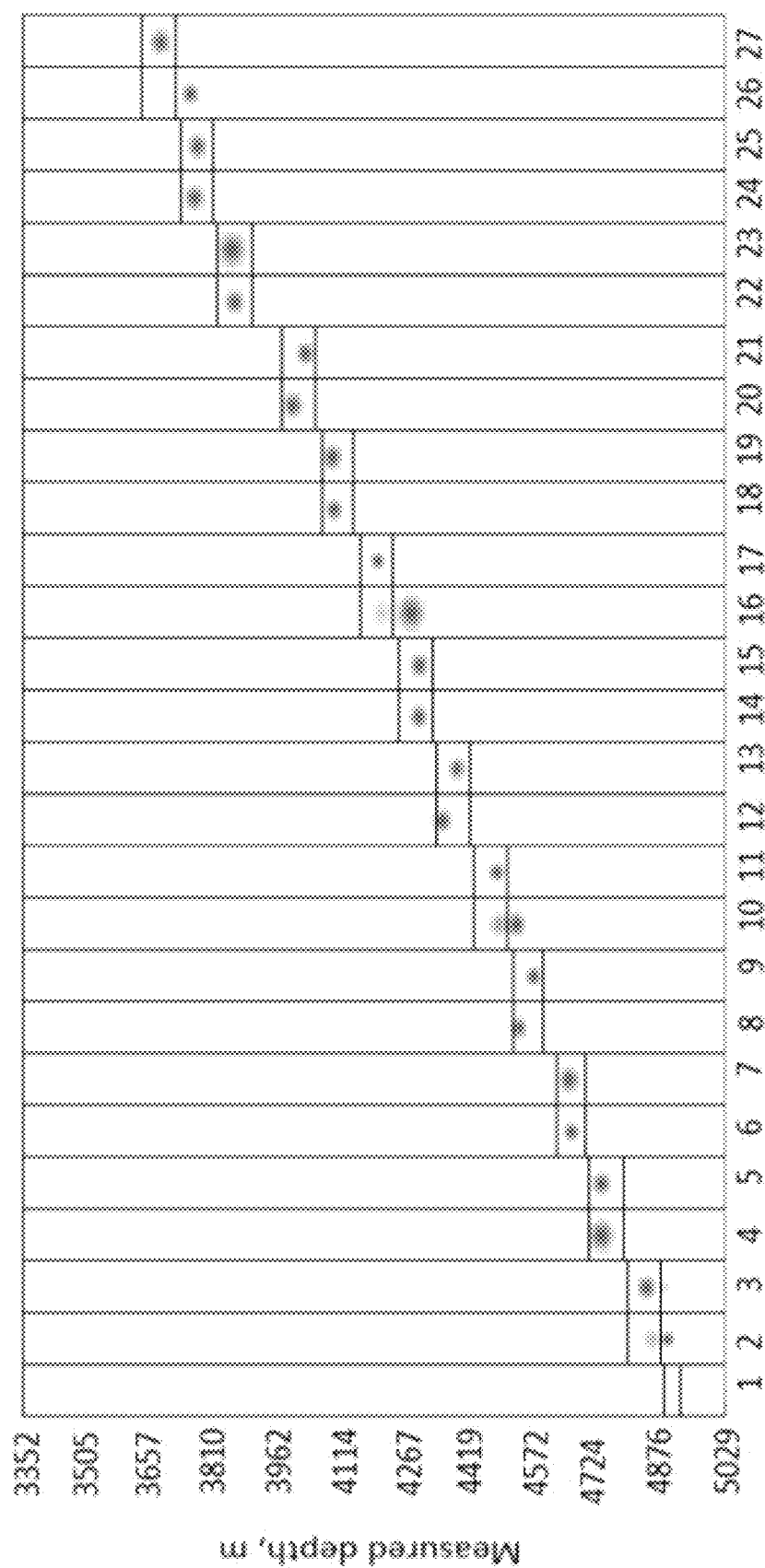
FIG. 8 shows detected fluid entry points (wellbore reflectors).

The fluid entry points (here—the wellbore reflectors) computed with a known pulse propagation velocity are shown in FIG. 8. The horizontal axis is the event number. The water hammer event (the signal source) is plotted in a section above. The vertical axis here represents the measured depth along the borehole. The horizontal dashes indicate the top and bottom of the expected perforation interval. The clouds indicate the fluid entry point depths. Their intensities represent the probabilities and their sizes indicate the uncertainties in depth determination.

The fluid entry plot can be used for treatment effectiveness evaluation. The diverter (a slug of particle-fiber slurry—the type of BroadBand Shield™ from Schlumberger) effectiveness is evaluated by a shift of the fluid entry point for the events pumped within single interval. The mechanical isolation effectiveness (plugged vs. unplugged entry) is evaluated by ensuring that the expected interval was stimulated. When the fluid entry point appears below the expected interval, this indicates a failure in mechanical isolation of this entry point. Possibility, this is due to overstimulation of the previous interval.

Finally, performance of the predictive deconvolution algorithm in comparison with the cepstrum algorithm will be demonstrated.

Figure 9:
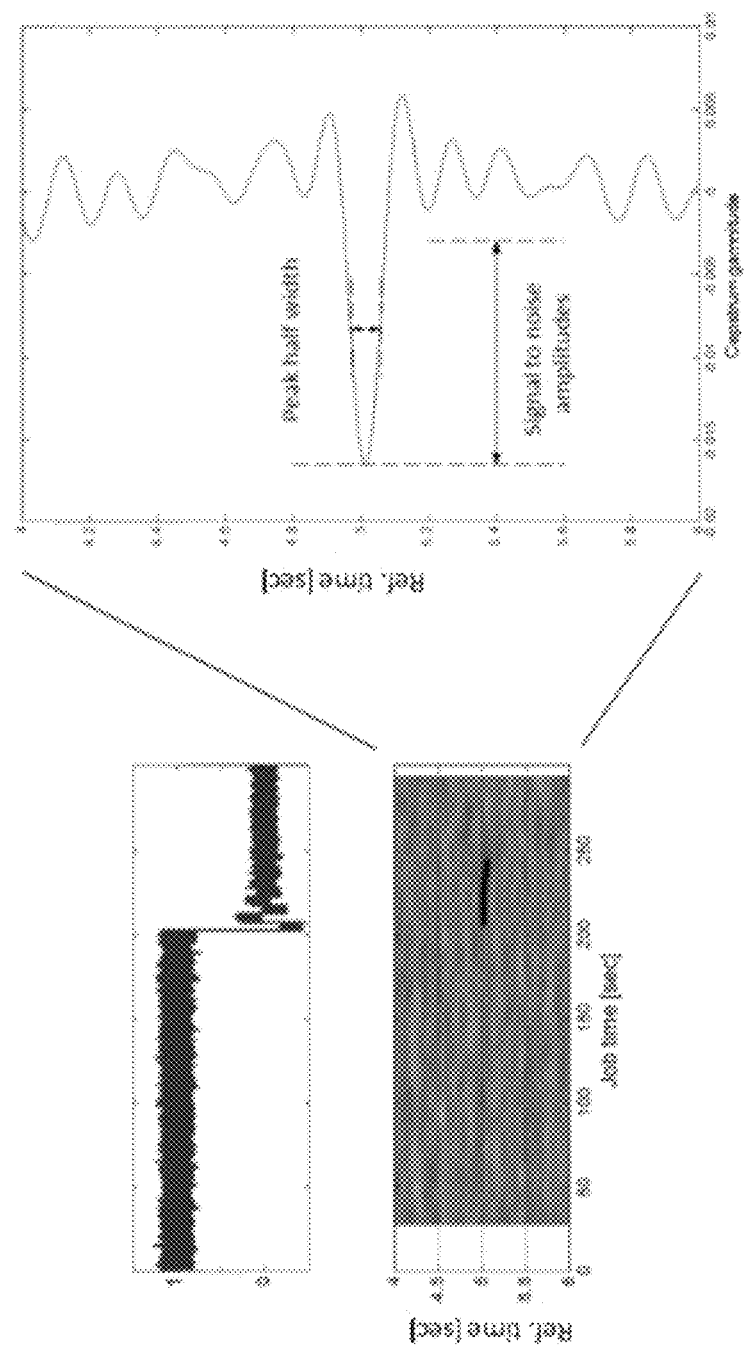
FIG. 9. shows peak half width at half height and signal to noise ratio for a single event.

Ideally, for robust fluid entry point depth determination the data processing algorithm should produce high reflectivity peaks against background noise (also known as high Signal to Interference Ratio—SIR) with narrow peak half width at half height as (see FIG. 9 as illustration).

Figure 10:
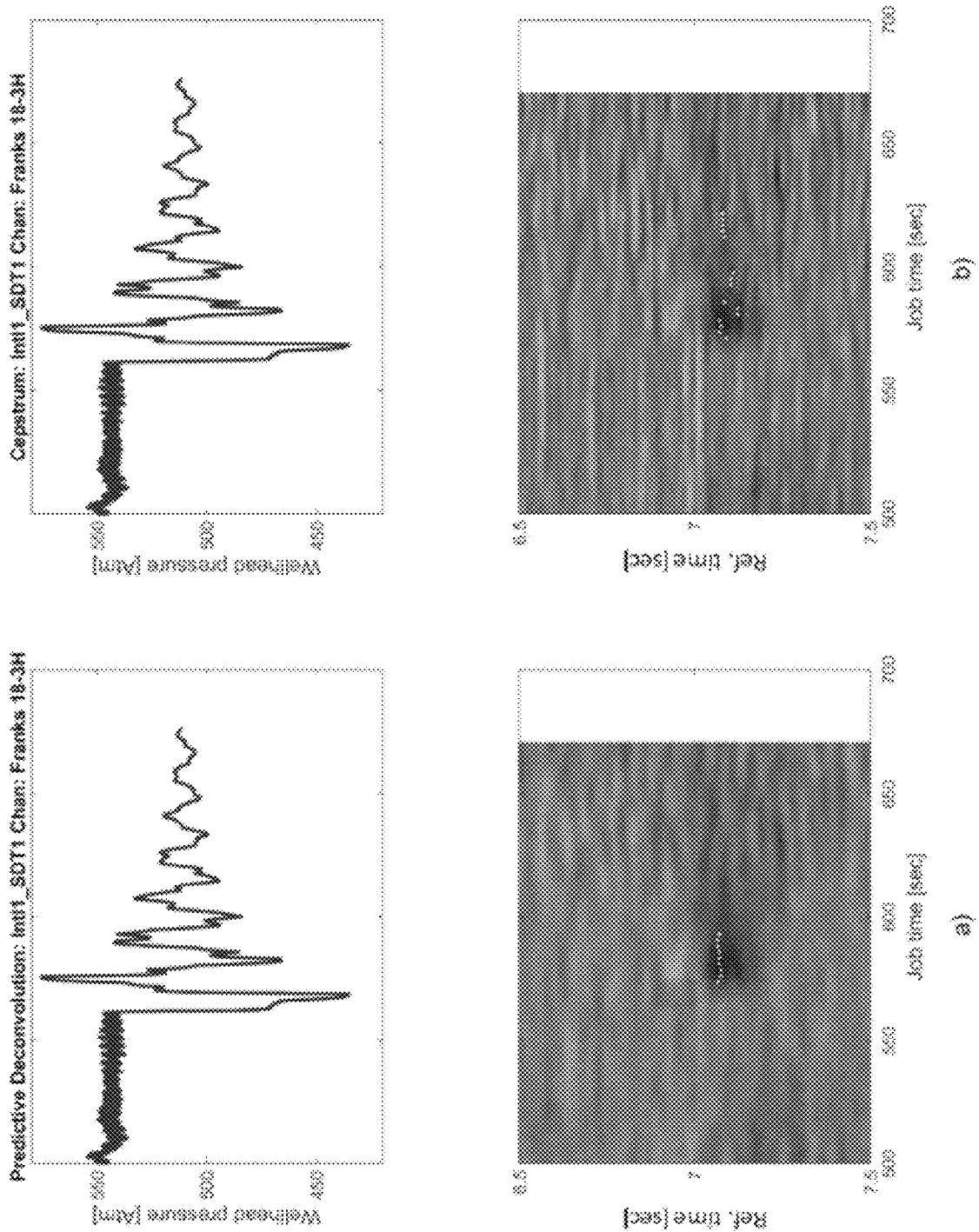
FIG. 10 shows wellbore reflectivity intensity plots from the same event processed by 10A (predictive deconvolution) and 10B (cepstrum analysis).

Practically, an excessive sensitivity of an algorithm to the background noise leads to less confidence in useful peak detection as it is illustrated in FIG. 10. The same event was processed with predictive deconvolution (a) and cepstrum (b). The high sensitivity of the cepstrum to the background noise results in more "striped" reflectivity intensity image and more scattered peak tracings as it is shown in FIG. 10(b).

Evaluation of these wellbore reflectivity intensity plots against the above quality measures is shown in Table 1. It can be seen that although the reflected signal intensity peak obtained by cepstrum is narrower than that for predictive deconvolution, the predictive deconvolution demonstrates higher signal no noise ratio with less peak scattering. Finally, the predictive deconvolution algorithm produces a longer peak (and therefore more confident) and more consistently traced peak.

TABLE 1

Comparison of useful signal parameters retrieved by predictive deconvolution vs. cepstrum analysis (for the same event presented in FIG. 10 (a) and (b).

| Quality parameter | Predictive deconvolution | Cepstrum analysis |
|---|---|---|
| Peak half width, s | 0.023242 | 0.016771 |
| Signal to noise amplitude | 1.12649 | 1.051887 |
| Trace scatter, s | 0.002487 | 0.009938 |
| Trace length, s | 28.80612 | 24.0051 |

Conclusion

The data processing algorithm based on predictive deconvolution is developed. It is linear and therefore is free of unpredictable low amplitude noise boosting. The algorithm's sensitivity to wellbore resonance frequencies is tuned by adjusting the expected two-way travel time intervals. Evaluation of the predictive deconvolution against tracing robustness requirements showed similar performance to the cepstrum algorithm for narrowband preprocessing (filter bandwidth of 6 Hz). However, for broadband preprocessing (filter bandwidth of 20 Hz) the new algorithm outperforms the cepstrum: its less sensitivity to background noise becomes more pronounced for broadband signals that enables more confident peak tracing with higher resolution.

Persons skilled in the art will recognize that the present disclosure can be implemented in various configurations of computer systems including portable devices, multiprocessor systems, microprocessor-based or programmable consumer electronic equipment, minicomputers, mainframes and the like. Any number of networks of computer systems and computers is acceptable for use with the present disclosure. The present disclosure can be implemented in a distributed computing environment, wherein the tasks are performed by remote processing facilities interconnected via a communications network. In a distributed computing environment, software modules may be located both in local and remote storage media. Therefore, the present disclosure can be implemented in conjunction with various hardware and software tools or their combination in a computer system or another processing system.

The implementation system of the present disclosure can be implemented on a computer. The system includes a computing unit, sometimes referred to as a computing system, which comprises a memory device, application software, user interface, video interface and a processing unit. The computing unit is mentioned as an example of a suitable computing environment and does not limit the scope of application or functionality of the present disclosure.

The memory device stores application programs, which can also be described as software modules containing computer-executable instructions executed by the computing unit to implement the present disclosure described herein.

The present disclosure can be implemented in a computer-executable program of instructions, such as software modules referred to as software applications or application programs executed by a computer. The software may include, for example, standard functions, programs, objects, data components and structures, which perform specific tasks or implement particular abstract data types. The software forms an interface, which allows the computer to response in accordance with the input source. The software can also cooperate with other code segments to initiate various tasks in response to the data received along with the source of the data received. The software may be stored and/or transferred on any memory device such as CD-ROM, magnetic disk, bubble memory, and semiconductor memory (e.g., various type of RAM or ROM). Furthermore, the software and its results can be transmitted by any of a variety of media such as optical fibers, metal wires, and/or by any of a variety of networks, such as the Internet.

The computing unit has a generalized memory device and typically includes various computer-readable media. As a non-limiting example, the machine-readable medium may contain a storage medium. The computing system memory device may include a storage medium in the form of a volatile and/or non-volatile storage, such a read-only memory (ROM) or random-access memory (RAM). The basic input/output system (BIOS) containing standard routines which help to transfer information between elements within the computing unit, for example during the start-up, is generally stored in the ROM. The RAM generally contains data and/or software modules which are available on-line and/or currently executed on the processing unit. As a non-limiting example, the computing unit includes an operating system, application program, other software modules and software data.

The components shown in the memory device may also be included in other removable/non-removable, volatile/non-volatile storage media, or they may be implemented in the computing unit by means of an application programming interface (API), which may be located in a separate computing unit connected via a computer system or network. For example, a hard disk drive can read from or write to a non-removable non-volatile magnetic medium; a magnetic disk drive can read from or write to a removable non-volatile magnetic disk; and an optical disk drive can read from or write to on a removable non-volatile optical disk, such as a CD ROM or other optical media. Other removable/non-removable, volatile/non-volatile storage media, which can be used in a typical operating environment, may include but are not limited to magnetic tape cassettes, flash memory cards, digital versatile discs (DVD), digital magnetic tapes, semiconductor RAM, semiconductor ROM and the like. Drives and their associated storage media described above ensure the storage of computer-executable instructions, data structures, software modules and other data for the computing unit.

The user can input commands and information into the computing unit via a user interface, which may be an input device, such as a keyboard or a pointing device commonly referred to as a mouse, trackball or touch pad. Input devices may include a microphone, joystick, satellite dish, scanner and the like. These and other input devices are often connected to the processing unit through a system bus, but may also be connected by other interface and bus structures, such as a parallel port or a universal serial bus (USB).

A monitor or other type of display device may be connected to the system bus via an interface, such as a video interface. A graphical user interface (GUI) may also be used with a video interface to receive instructions from the user interface and transfer instructions to the processing unit. In addition to the monitor, computers may also include other peripheral output devices such as speakers and a printer, which may be connected through an output peripheral interface.

Although many other components of the computing unit are not shown, persons skilled in the art will appreciate that such components and their interconnection are well known.

It is apparent that the above embodiments shall not be regarded as a limitation of the patent claims scope. It is clear for a person skilled in the art that it is possible to introduce many changes to the technique described above without departing from the principles of the claimed disclosure.

The invention claimed is:

1. A method of determining depth of wellbore reflectors by analyzing a pressure signal at a wellhead, the method comprising:
    performing a wellbore operation producing a pressure wave and its reflections from the wellbore reflectors;
    registering the pressure wave and its reflections with a high-frequency pressure sensor at the wellhead;
    automatically preprocessing the registered pressure wave and its reflections by applying a linear combination of a zero frequency notch filter and a lowpass filter, wherein application of the linear combination is configured to preserve a periodic structure of a reflected signal;
    transforming the registered pressure wave and its reflections from a time domain representation into a frequency domain representation with a Short Time Fourier Transform (STFT);
    applying a predictive deconvolution filter to the frequency domain representation after transforming the registered pressure wave and its reflections into the frequency domain representation to produce a normalized intensity of wellbore reflectivity, wherein applying the predictive deconvolution filter comprises:
        generating a normalized intensity of wellbore reflectivity response; and
        tuning one or more expected two-way travel time intervals to improve a sensitivity of the predictive deconvolution filter;
        identifying the reflected signal on a plot in coordinates of reflection time as a function of physical time and determining a respective reflection time for a respective signal reflected from the wellbore reflectors; and
        determining a depth of a respective wellbore reflector by multiplying the respective reflection time by a pressure wave speed.

2. The method of claim 1, wherein the wellbore operation is a hydraulic fracturing operation, and the pressure wave is caused by a water hammer due to stop or start of a surface pump, noise from a subsurface pump, or noise from an operating surface pump.

3. The method of claim 1, wherein the wellbore reflectors are one of hydraulic fractures, well bottom, or a joint of casing pipes of different diameters.

4. The method of claim 1, wherein the frequency domain representation is computed for an original and delayed pressure wave and its reflections.

5. The method of claim 1, wherein the pressure wave speed is used to determine the depth of the respective wellbore reflector based on peaks of normalized intensity and one or more contours of reflection times for the respective wellbore reflector.

6. The method of claim 5, wherein the one or more contours of reflection times for the respective wellbore reflector is determined by tracing intense positive or negative peaks.

7. A system for determining depth of wellbore reflectors by analyzing a pressure signal at a wellhead, the system comprising:
    a wellbore enabling performing a wellbore operation producing a pressure wave and its reflections from the wellbore reflectors;
    a wellbore high-frequency pressure sensor configured for registering a pressure wave and its reflections;

a processing system configured to receive and automatically process data obtained by the pressure sensor during well operation, wherein the processing comprises:
preprocessing a registered pressure wave and its reflections by applying a linear combination of a zero frequency notch filter and a lowpass filter, wherein application of the linear combination is configured to preserve a periodic structure of a reflected signal;
transforming the registered pressure wave and its reflections from a time domain representation into a frequency domain representation with a Short Time Fourier Transform (STFT);
applying a predictive deconvolution filter to the frequency domain representation after transforming the registered pressure wave and its reflections into the frequency domain representation to produce a normalized intensity of wellbore reflectivity, wherein applying the predictive deconvolution filter comprises:
generating a normalized intensity of wellbore reflectivity response; and
tuning one or more expected two-way travel time intervals to improve a sensitivity of the predictive deconvolution filter;
identifying the reflected signal on a plot in coordinates of reflection time as a function of physical time and determining a respective reflection time for a respective signal reflected from the wellbore reflectors; and
determining a depth of a respective wellbore reflector by multiplying the respective reflection time by a pressure wave speed.

8. The system of claim 7, wherein the wellbore operation is a hydraulic fracturing operation, and the pressure wave is caused by a water hammer due to stop or start of a surface pump, noise from a subsurface pump, or noise from an operating surface pump.

9. The system of claim 7, wherein the wellbore reflectors are one of hydraulic fractures, well bottom, or a joint of casing pipes of different diameters.

10. The system of claim 7, wherein the processing system is configured to compute the frequency domain representation for an original and delayed pressure wave and its reflections.

11. The system of claim 7, wherein the processing system is configured to determine the depth of the respective wellbore reflector using the pressure wave speed based on peaks of normalized intensity and one or more contours of reflection times for the respective wellbore reflector.

12. The system of claim 11, wherein the processing system is configured to determine the one or more contours of reflection times for the respective wellbore reflector by tracing intense positive or negative peaks.

13. The method of claim 1, wherein the predictive deconvolution filter produces a long and consistently traced peak.

14. The method of claim 1, wherein automatically processing comprising processing data by tracing on a reflectivity intensity plot.

15. The system of claim 7, wherein the predictive deconvolution filter produces a consistently traced peak.

16. The system of claim 7 wherein the processing system automatically processes data by tracing on a reflectivity intensity plot.

17. The method of claim 1, wherein identifying the reflected signal on the plot comprises applying an inverse Fourier transform of the normalized intensity of the wellbore reflectivity.

18. The system of claim 7, wherein identifying the reflected signal on the plot comprises applying an inverse Fourier transform of the normalized intensity of the wellbore reflectivity.

* * * * *